Patented July 31, 1934

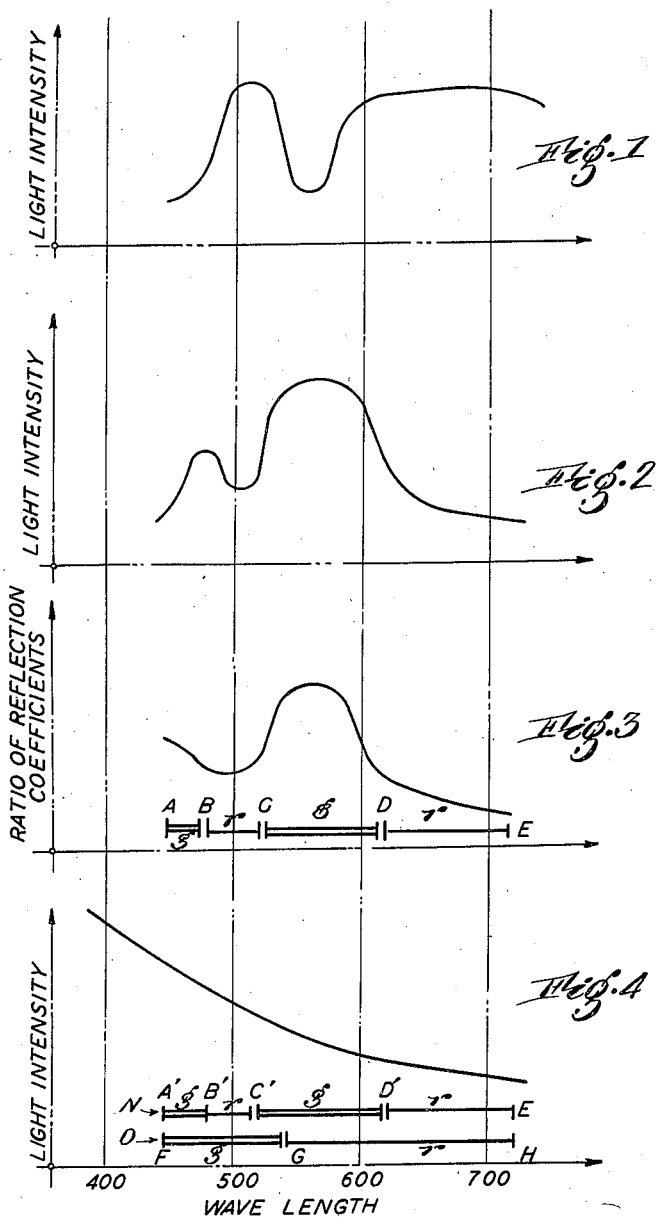

1,968,112

UNITED STATES PATENT OFFICE 1,968,112

COLOR PHOTOGRAPHY

Eastman A. Weaver, Winchester, Mass., assignor, by mesne assignments to Technicolor, Inc., New York, N. Y., a corporation of Delaware Application February 24, 1930, Serial No. 430,486

13 Claims. (Cl. 95—2)

The present invention relates to the art of color photography and more particularly to color separation.

One of the most important problems in the art of color photography where separate records of different color aspects of an object are made, is the selection of the parts of the spectrum to be recorded on each of the separate color records. The time of exposure should be as short as possible, especially in the case of color cinematography which demands the highest possible light intensity, and on the other hand, the color separation has to be as perfect as possible, taking also in account the fact that in certain systems of color photography, only part of the spectrum is used, as for instance in two color photography with the primary colors green and red-orange, where the blue color is largely omitted. It will be apparent to any one skilled in the art that a perfect reconciliation of these requirements is impossible. However, I have found a solution of this problem which fills practical requirements to a satisfactory degree, by taking into account the tints of the principal objects to be photographed, in selecting the spectral ranges of the several color records.

The principal objects of my invention are the following ones:

To provide a system of color photography which reconciles optimum effective light intensity with satisfactory color separation.

To provide a method of separating the spectral colors which renders one of the prominent colors substantially neutral, whereas the other prominent colors are well separated and a favorable light intensity is obtained.

To provide a set of corresponding color filters which permits the practical application of my system of color separation.

The invention will be explained, in connection with the appended drawing, as applied to a two color photography system using red and green filters. It is however understood that it can be modified to any other color combination and that it can not only be applied to color separation with filters but also with emulsions sensitized for certain colors, or to combinations of both, as for instance in so-called monopacks, bipacks, etc.

In the drawing,

Fig. 1 is a diagram showing the intensity of the light of various wave lengths, as reflected from human skin;

Fig. 2 is a diagram corresponding to Fig. 1 for the light reflected from foliage;

Fig. 3 is a diagram showing the ratio of the reflection coefficients of human skin and of foliage and the range of filters according to my invention, in relation to this diagram; and Fig. 4 is a diagram showing the spectral distribution of the light coming from a blue sky, in relation to the ranges of ordinary filters and of filters according to my invention.

In the following description the term "taking ranges" will be used for the spectral ranges into which the light coming from the objects to be photographed are separated in order to depict them again by superimposing their records printed in appropriate colors. The term "prominent colors" will be used for the colors most important in a given scene to be photographed, as for instance the blue and red in the American flag.

As mentioned above, maximum light transmission together with satisfactory color separation and a favorable rendering of those parts of the picture whose colors are not actually represented on the final record are some of the main problems encountered in the art of color photography, and especially in color cinematography, where very short periods of exposure are essential and where frequently only part of the solar spectrum is utilized. The most favorable color separation together with high light intensity affecting the final aspect of the picture, could be obtained by transmitting no part of the spectrum through more than one of the taking filters, since the so-called "graying down" or "diluting" of a tint, i. e. the rendering of the clear color components of the tint together with a number of complementary components increases with the increasing overlapping of the transmission ranges of the taking filters into which that tint is separated, a fact well known in the art. A minimum amount of graying down can be achieved by utilizing only a narrow spectral band for each taking range, which however limits the effective light intensity. It is therefore desirable to widen the taking ranges, but in a manner which does not cause any undesirable graying down. In selecting the taking ranges it must furthermore be considered that existing dyes do not transmit absolutely sharp bands of the spectrum so that it is not feasible to transmit adjacent spectral regions through two filters without having an intermediate region which is at least partially transmitted by both. However this circumstance is not altogether unfavorable because a limited amount of graying down is desirable, as too intense colors must be avoided, especially if the picture is to be reproduced by projecting it onto a screen.

For the purpose of explanation it will be assumed that my invention, which takes account of the facts outlined above, is to be applied to a system of color photography which has heretofore involved the taking of cinematographic pictures by means of color separation with a red-orange and a green filter, corresponding to two of the three well known principal physiological exitation ranges, the third range remaining substantially unrecorded. My experience in color photography has shown that in a system of this kind the first of two vital considerations in connection with the problems as outlined above relates to color separation as limiting light transmission I have found that the prominently colored components of the ordinary cinematographic picture for physiological as well as psychological and esthetic reasons, are flesh tint and foliage tint. These tints have to be distinguished markedly from each other; that is, flesh colored objects have to be rendered sufficiently red-orange, the foliage colored objects have to be rendered sufficiently green, and each must be separately distinguished from the white. The second consideration relates to the fact that skies which can not be rendered correctly in a two color system not making use of the blue, should not appear too green; they will appear the more natural, the more nearly neutral they are rendered.

In order to find taking ranges in conformity with the facts and considerations discussed, I have made a spectro-photometric study of the composition of the prominent colors, i. e. of the light reflected from flesh tint and from foliage. I find in general that flesh tint is strong in wave lengths from 700 to 590 m$\mu$., weak from 590 to 530 m$\mu$., strong from 530 to 495 m$\mu$., and weak again from 495 m$\mu$. to ultra violet. Foliage is weak from 700 to 610 m$\mu$., strong from 610 to 520 m$\mu$., and weak from 520 m$\mu$. to ultra violet, although from about 490 to 460 m$\mu$. not as weak as flesh. The curves obtained in this manner are of the general configuration as shown in Figs. 1 and 2, but of course they are subject to rather wide variations according to the objects investigated in each particular case. Considering now the shape of these curves, it appears that the spectral sections of the two prominent colors are, generally speaking, of a complementary character, each being substantially weak where the other is strong.

In order to find out what would constitute the best possible pair of filters for reproducing a scene of this nature according to the principles explained above, I have plotted the ratio of the reflection coefficients of flesh tint and leaf tint throughout the spectrum. The resulting curve as shown in Fig. 3 is low from 700 to 600 m$\mu$., high from 600 to 520 m$\mu$., low from 520 to 480 m$\mu$., and then again higher. The regions of the spectrum where this curve is low should be transmitted by the red filter and absorbed by the green filter and vice versa for the parts where the curve is high. Thus, in the ideal case the red filter should have a principal transmission region approximately from 700 to 600 m$\mu$. and a second transmission region from 520 to 480 m$\mu$., while the green filter should transmit from 600 to 520 m$\mu$. and from 480 to 450 m$\mu$., as schematically indicated in Fig. 3, AB and CD corresponding to the range of the green filter and BC and DE to that of the red filter.

The appearance of such filters, or their physiological effect, is somewhat but not substantially influenced by the addition of the auxiliary transmission ranges, in comparison to ordinary two-color filters. The red filter may appear somewhat pinkish and the blue-green filter somewhat more blue.

Coming now to the second vital consideration, namely, the rendering of the blue color, it is well known in the art that sky light has a spectral distribution continuously increasing from the red to the blue, substantially as shown in Fig. 4, which gives the spectral qualities of blue sky light. Considering this fact it will be seen that a set of filters having alternative transmitting bands as above described and as schematically shown at N in Fig. 4 will give less difference of exposure on the two color records and therefore a less intense green on the final picture which is printed with green and red-orange dyes, than a pair of filters as heretofore used, which would result in a positive having a green aspect corresponding to the whole range EG of the green part of the spectrum in addition to weak part GH in the red-orange, as shown at O of Fig. 4. A positive made with my filters will only have a green aspect corresponding to A'B' of Fig. 4 which, together with a red apsect corresponding to B'C', and not very much weaker than the green aspect, will print with the green and red-orange positive colors a nearly neutral sky satisfying the second consideration referred to above.

Having in mind these requirements for filters according to my invention, it is now necessary to have dyes with transmitting characteristics corresponding to these requirements. It is evident that the filter ranges as described above and shown on the drawing correspond to ideal conditions which it will not always be possible to obtain in actual practice, and that filters as actually used will often somewhat depart from this ideal, this being mostly due to the facts that available dyes do not have sharp absorption bands, that illumination conditions vary considerably, etc. However, even if somewhat departing from the ideal, filters made according to the basic principle of my invention are still more effective than ordinary filters. According to practical experience, light transmission, color separation and the rendering of the blue are still very favorable if for instance, in the embodiment described above, the green filter does not actually have two distinctly separate bands but merely transmits less light in a region approximately corresponding to the low wave length transmission band of the red filter or even if both filters extend into the blue range of the spectrum. Especially the beneficial effect of my filters upon the rendering of the blues will not be diminished even if each filter transmits a substantial part of the lower wave lengths of the visible spectrum, the main consideration being that light of these low wave lengths is to a considerable degree recorded on both color aspects, so that these blue parts are finally printed in a light neutral shade, as explained above. However, for the described application of my invention to color photography with separation of the red-orange and green colors I found the following filters suitable, as having transmitting characteristics corresponding with sufficient accuracy to the ranges described in connection with Fig. 3. For the red filter I bathe a suitable base as e. g. gelatine of a thickness of approximately .002 inch for about two minutes, at approximately 65° F. in the following dye:

|  | Percent |
|---|---|
| Eastman yellow (glucose phenyl-osazone-p-p'-dicarboxylic acid) | 0.24 |
| Rhodamine (Acid Rhodamine 3R, an acid triphenyl methane dye) | 0.90 |
| Sodium acetate ($CH_3.COO\ Na$) | 0.80 |
| Water | 98.06 |

Use one part of this to two parts of water solution.

For the green filter, I use analogously:

| | Percent |
|---|---|
| Uranine (Schultz #585) | 0.25 |
| Potassium carbonate (K₂CO₃) | 2.00 |
| Sodium acetate (CH₃COO Na) | 2.00 |
| Water | 95.75 |

Use two parts of this solution with three parts of a 2.50% solution of Fast Light green (an acid triphenyl methane dye).

Although I prefer the above formulas, I have found that instead of the Eastman yellow, Naphthol yellow (Schultz No. 7), Quinoline yellow (Schultz No. 613) or Auramine (Schultz No. 493) may be used, that instead of Rhodamine, Rose bengal (Schultz No. 595) may be used, that instead of Uranine (Schultz No. 585,) (a sodium salt of Fluorescin, (Free Acid, Schultz No. 585)) other derivatives of Fluorescin may be used, and that instead of Fast Light green, Patent blue, (Schultz No. 543) Guinea green or (Schultz No. 502) or Erio green (Schultz No. 564) may be taken, always presuming that any two of the above enumerated substances will be combined only if their nature will not cause any chemical reaction between them. I prefer to dry the dyed gelatine filters on glass in a moving air current, in from 30 to 40 minutes. I found that these filters show about 40% more exposure, give equal distinction between flesh and foliage tints and between both and neutral, and better, because paler skies, than the color filters heretofore used for these purposes.

It will be apparent to any one skilled in the art that the principle of my invention can be applied not only to the specific embodiment described above, but also to any other combination of prominent colors, with any desirable number of filters and with one or more principal spectral colors omitted, or utilizing the whole spectrum. It is also apparent that the application of the principle is not limited to color separation with filters, but that it can advantageously be used with any other means for color separation, or combination of such means as for instance in the case of the so-called bi-packs, well known in the art, where obviously a combination of emulsion-sensitization and filter absorption according to this principle would have to be used.

I claim:

1. A set of two taking filters for color photography, one of said filters being stained with a dye containing Eastman yellow (glucose phenyl-osazone-p-p'-dicarboxylic acid) and acid Rhodamine (acid Rhodamine 3R, an acid triphenyl methane dye), and the other of said filters being stained with a dye containing Fluoreszein in Schultz No. 585) and Fast Light green S acid triphenyl methane.

2. A light filter comprising light transmitting material containing a dye of the acid triphenyl methane type, in about such strength as is absorbed by commercial sheet gelatine of an approximate thickness of .002 inch, in about two minutes at approximately 65° F. from a ½ to 2% solution, together with a dye of the pyrazolon type.

3. A light filter comprising light transmitting material containing a dye of the oxy phthalein type and a dye of the acid triphenylmethan type, in about such strengths as are absorbed by commercial sheet gelatine of an approximate thickness of .002 inch, in about two minutes at approximately 65° F. from a solution containing .03 to .3% of Uranine (Schultz No. 585, Sodium Salt), 1 to 4% Fast Light green S and ½ to 2% of potassium carbonate.

4. In the art of two color photography, the method which comprises recording on one film the intermediate section of the spectrum and a portion of the short wave length section, recording on another film the long wave length section and substantially another portion of said short wave length section, printing positives of the records, and coloring said positives in hues substantially complementary to those of said intermediate and long wave length sections respectively, whereby said short wave length section is rendered substantially neutral.

5. In the art of color photography by separately recording several principal exitation ranges, the method of rendering substantially neutral a spectral range for which no special record is provided, which comprises separately recording each of two principal ranges together with substantially different portions of said spectral range, printing positives of the records and reproducing said positives in hues substantially corresponding to said principal ranges.

6. In the art of color photography, the method of rendering substantially neutral the short wave length range of the spectrum, which comprises taking one color record with the approximate ranges from 700 to 600, and from 520 to 480 mµ, taking a second color record with the approximate ranges from 600 to 520, and from 480 to 450 mµ, printing positives of said records and coloring said positives in hues substantially complementary to the longer wave length ranges of the filters.

7. A set of two continuously colored taking filters for color photography, each of said filters having a principal and a secondary region of high spectral transmission separated by comparatively low spectral transmission bands, and each filter having a different physiological effect, the regions of high transmission of the one filter corresponding approximately to low transmission bands of the other filter, each of said principal regions, and the two secondary regions combined, substantially covering respective principal exitation ranges.

8. A set of two continuously colored taking filters for color photography, the first filter having a main transmission region in the long wave length section of the spectrum and a secondary transmission region in the short wave length section of the spectrum, and the second filter having a main transmission region in the intermediate section of the spectrum and a secondary transmission region substantially different from said first secondary region in the short wave length section of the spectrum, the filters having different physiological effects.

9. A set of two taking filters for color photography, the first filter having a main transmission region in the red-orange section of the spectrum and a secondary transmission region in the blue section of the spectrum, and the second filter having a main transmission region in the green section of the spectrum and a secondary transmission region in another part of the blue section of the spectrum.

10. A set of two taking filters for color photography, one of the filters of said set having a transmission band approximately from 700 to 600 mµ., and a second transmission band approximately from 520 to 480 mµ., and the other filter having a transmission band approximately from 600 to 520 mμ., and a second transmission band approximately from 480 to 450 mμ.

11. The method of making color photographs which comprises recording with the aid of a filter upon one film the long wave length section of the spectrum and a portion of the short wave length section, and recording on another film with another filter the intermediate wave length section and another portion of the short wave length section, whereby the filters transmit like portions of the spectrum only as far as desirable for diluting the colors.

12. The method of making color photographs of object fields reflecting two prominent colors, each of these colors having two reflection maxima, one maximum of each color corresponding to a distinct principal exitation range, which method comprises recording each of said colors through a separate filter, each filter transmitting mainly said reflection maxima of its color.

13. The method of making color photographs of object fields having two prominently colored components, each component substantially corresponding to a principal exitation range but having a secondary reflection maximum in another exitation range, which method comprises the taking of each prominent color through a filter whose transmission maxima correspond to the reflection maxima of said color.

EASTMAN A. WEAVER.